United States Patent
Stierer et al.

(10) Patent No.: US 9,610,221 B2
(45) Date of Patent: Apr. 4, 2017

(54) ADJUSTABLE VIAL HOLDER

(71) Applicants: Tracey Stierer, Phoenix, MD (US); Kevin Stierer, Phoenix, MD (US)

(72) Inventors: Tracey Stierer, Phoenix, MD (US); Kevin Stierer, Phoenix, MD (US)

( * ) Notice: Subject to any disclaimer, the term of this patent is extended or adjusted under 35 U.S.C. 154(b) by 0 days.

(21) Appl. No.: 14/798,587

(22) Filed: Jul. 14, 2015

(65) Prior Publication Data
US 2017/0014307 A1    Jan. 19, 2017

(51) Int. Cl.
*A47F 5/00* (2006.01)
*A61J 1/16* (2006.01)
*F16M 11/10* (2006.01)

(52) U.S. Cl.
CPC ............... *A61J 1/16* (2013.01); *F16M 11/10* (2013.01)

(58) Field of Classification Search
CPC .................................. A61J 1/16; F16M 11/10
USPC ... 248/105, 106, 125.3, 125.9, 176.1, 188.9, 248/311.2, 313, 354.4, 413, 125.1, 125.2, 248/176.2, 206.5, 311.3; 141/1, 27
See application file for complete search history.

(56) References Cited

U.S. PATENT DOCUMENTS

| | | | |
|---|---|---|---|
| 1,154,904 A * | 9/1915 | Bain ..................... | F16M 13/02 248/121 |
| 1,858,144 A * | 5/1932 | Fariello .................. | B25B 27/00 248/229.15 |
| 2,654,556 A * | 10/1953 | Lathrop ..................... | A61J 9/06 248/105 |
| 3,661,189 A * | 5/1972 | Bowser ............... | A61M 5/1782 141/1 |
| 4,466,203 A * | 8/1984 | Thomas ................. | A45D 20/12 248/125.3 |
| 5,636,815 A * | 6/1997 | Wilson ................... | A45D 20/12 248/125.3 |
| 6,390,424 B1 * | 5/2002 | Kidushim ............. | A45D 20/12 248/122.1 |
| 8,678,328 B2 * | 3/2014 | Smith ................. | F21V 21/0885 248/125.3 |
| 2009/0224117 A1 * | 9/2009 | Kaneda ................... | F16B 47/00 248/206.3 |
| 2012/0000571 A1 | 1/2012 | Foscarota | |
| 2012/0103464 A1 * | 5/2012 | Molina ..................... | A61J 1/16 141/27 |
| 2012/0104191 A1 * | 5/2012 | Ye ........................ | F16M 11/041 248/125.1 |

* cited by examiner

*Primary Examiner* — Gwendolyn Baxter
(74) *Attorney, Agent, or Firm* — Dunlap Bennett & Ludwig PLLC

(57) ABSTRACT

A swiveling vial holder formed of a base, a vertical post and a bracket is provided. The base is configured to rest on a surface and support the swiveling vial holder in an upright position. The vertical post may be substantially perpendicular to and extend vertically from the base. The bracket includes an opening sized to secure a vial within. The bracket is secured to the vertical post by a connector. The bracket may be secured to the vertical post at different heights of the vertical post. Further, the bracket is rotatable about an axis perpendicular to the vertical post.

5 Claims, 4 Drawing Sheets

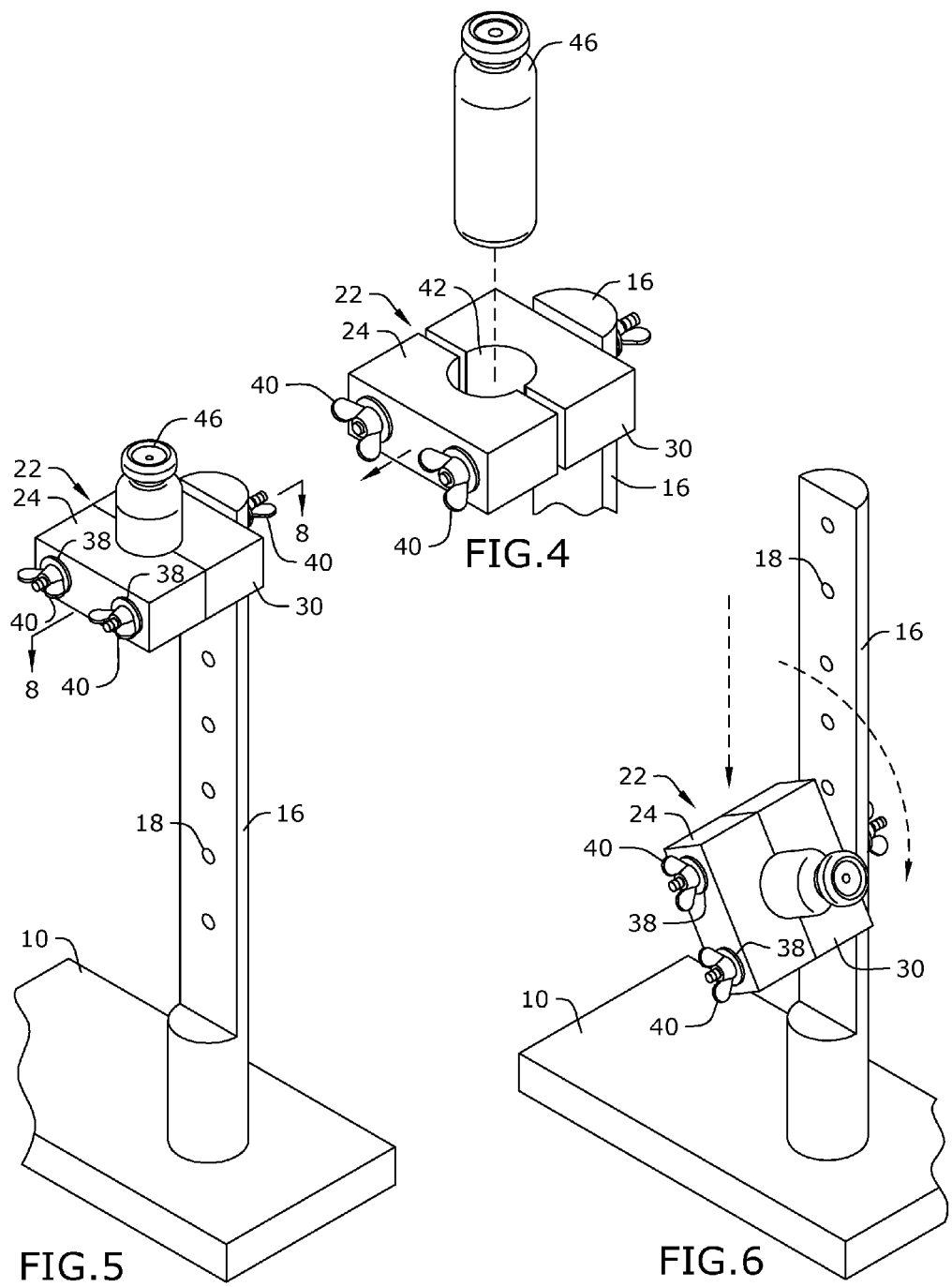

ADJUSTABLE VIAL HOLDER

BACKGROUND OF THE INVENTION

The present invention relates to vials and, more particularly, to an adjustable vial holder.

A vial (also known as a phial or flacon) is a small glass or plastic vessel or bottle, often used to store medication as liquids, powders or capsules. Withdrawing correct dosages of medication from the vial can be difficult and may result in bent needles and personal injuries. A vial holder may be used in withdrawing medication from vials. However, vial holders may secure the vial in an inconvenient position and may only hold one size of vials.

As can be seen, there is a need for an adjustable vial holder.

SUMMARY OF THE INVENTION

In one aspect of the present invention, a swiveling vial holder comprises: a base configured to rest on a surface and support the swiveling vial holder in an upright position; a vertical post extending from the base; a bracket comprising an opening sized to secure a vial within; and a connector connecting the bracket to the vertical post, wherein the connector is operable to connect the bracket at a plurality of different heights along the vertical post, wherein the bracket rotates about an axis perpendicular to the vertical post These and other features, aspects and advantages of the present invention will become better understood with reference to the following drawings, description and claims.

BRIEF DESCRIPTION OF THE DRAWINGS

FIG. 4 is a detail exploded view of an embodiment of the present invention demonstrating insertion of the vial;

FIG. 5 is a perspective view of the present invention shown in an exemplary initial configuration;

FIG. 6 is a perspective view of the present invention shown in an exemplary secondary configuration;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an adjustable swiveling vial holder to secure vials for the extraction of medication. A bracket configured to secure a vial within is mounted on a post at a convenient height. The bracket may swivel to permit the vial to be placed at an angle. The bracket is also adjustable for multiple sized vials. In addition, the vials do not need to be removed until they are empty. When the vial is in the holder, both hands can be used to hold a syringe, providing ease of use, and overall safety. Furthermore, the device is well suited for in home use. The present invention is very beneficial to those requiring daily use of a syringe to administer medications, such as insulin, that are dispensed in a vial.

Figure 1:
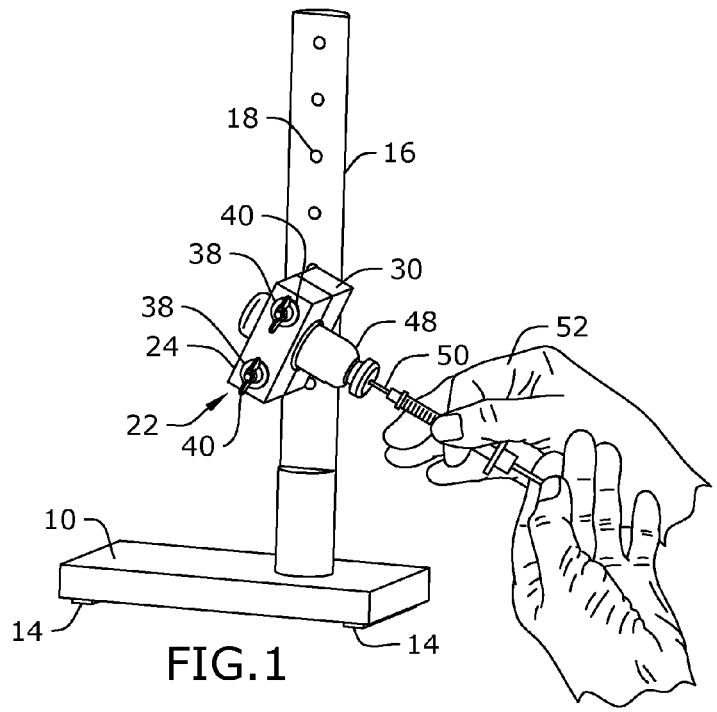
FIG. 1 is a perspective view of an embodiment of the present invention in use.
Figure 2:
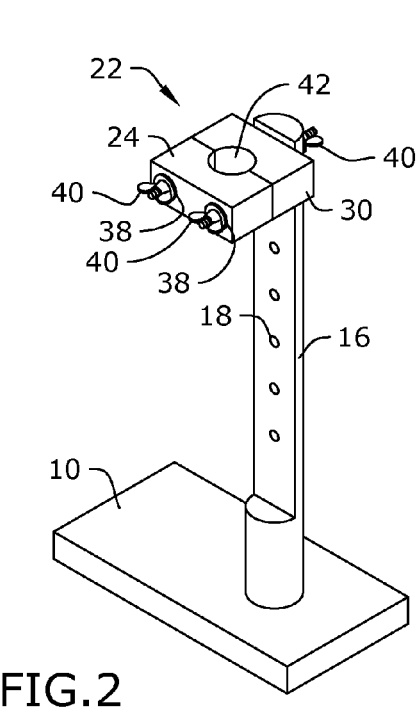
FIG. 2 is a front perspective view of an embodiment of the present invention.
Figure 3:
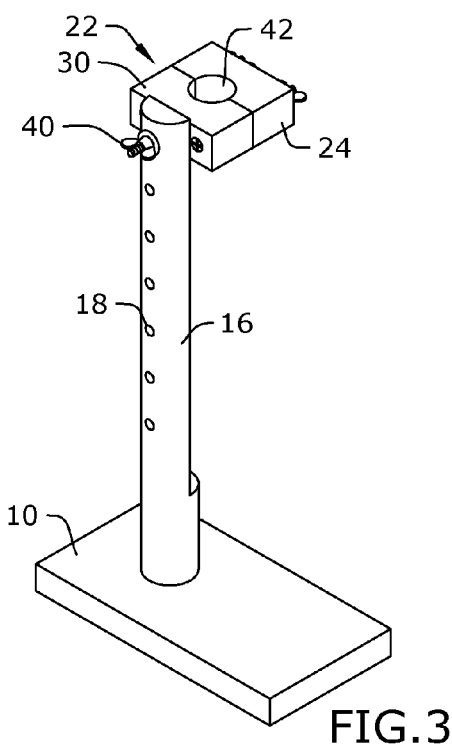
FIG. 3 is a rear perspective view of an embodiment of the present invention.
Figure 7:
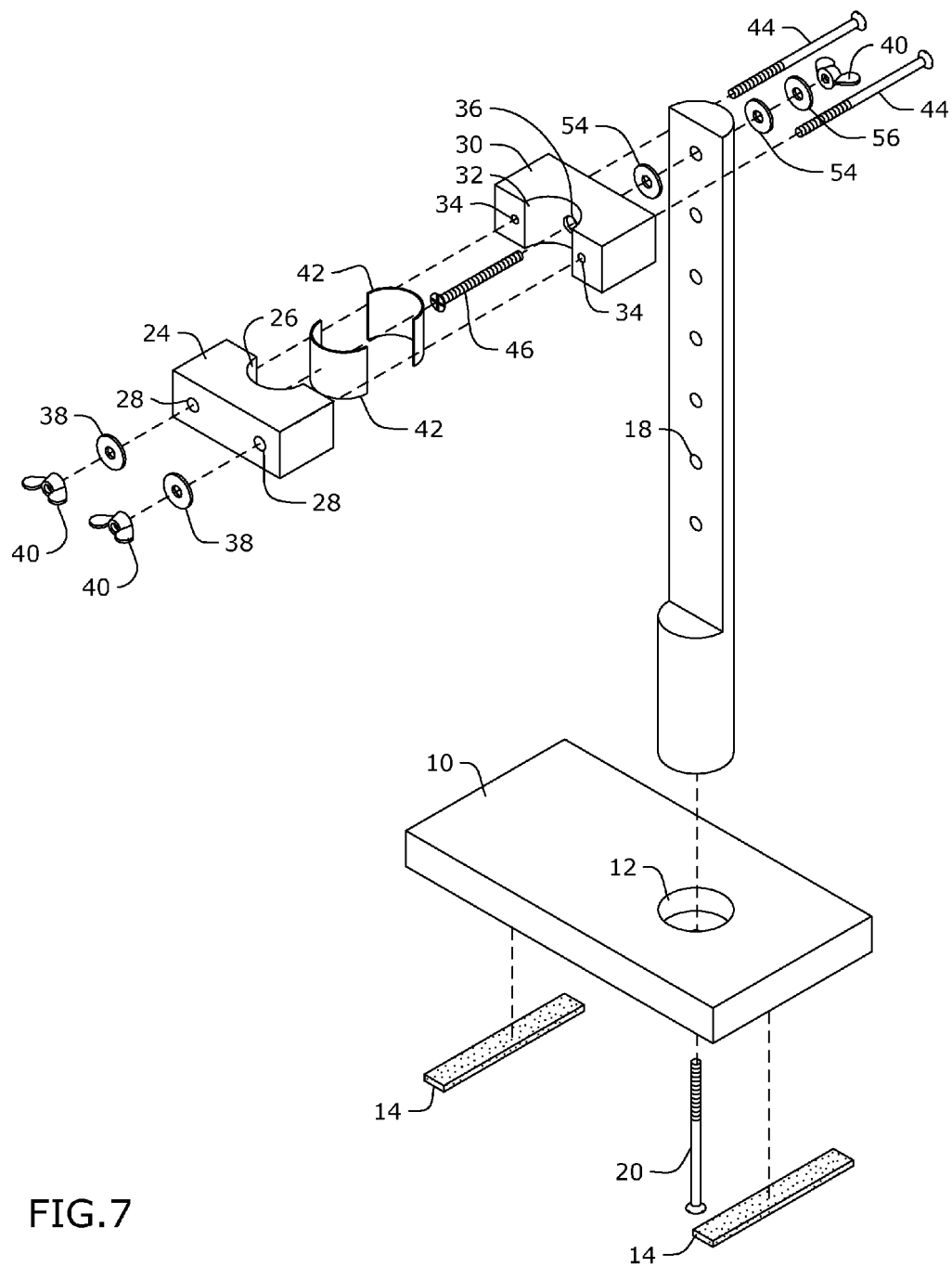
FIG. 7 is an exploded view of an embodiment of the present invention.
Figure 8:
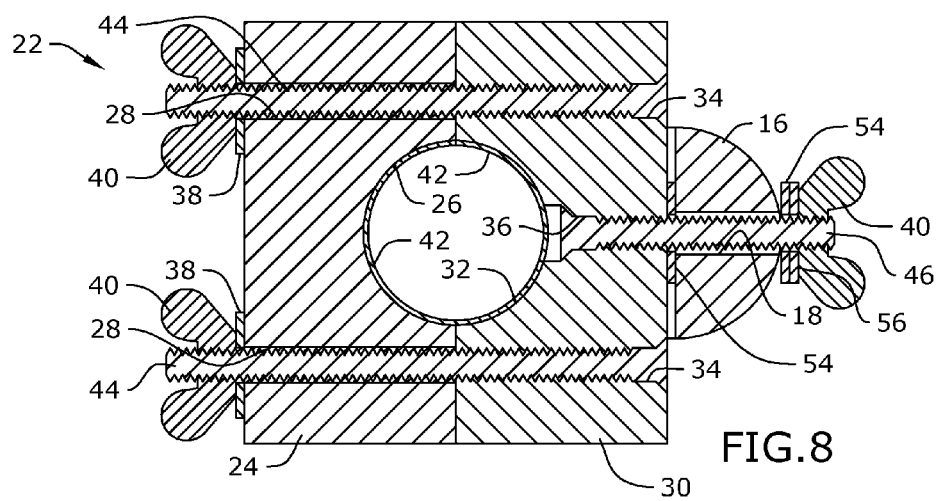
FIG. 8 is a section view of the present invention along line 8-8 in FIG. 5.
Figure 9:
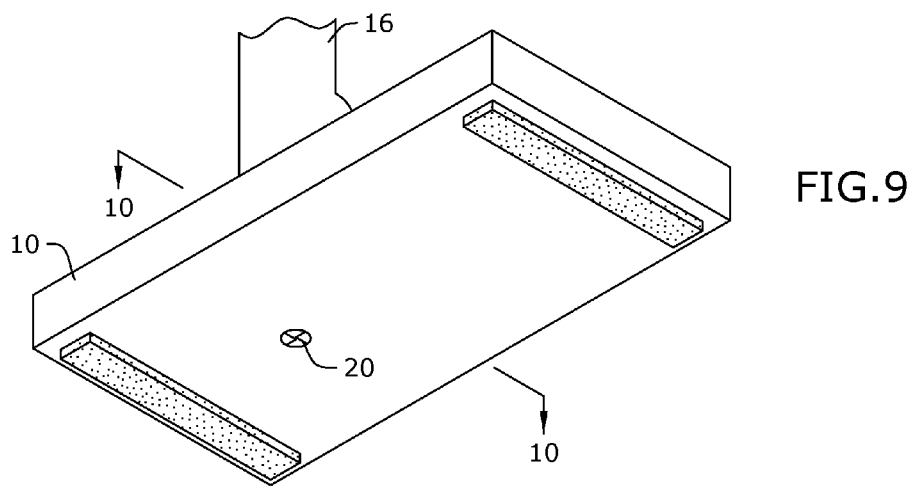
FIG. 9 is a bottom perspective view of an embodiment of the present.
Figure 10:
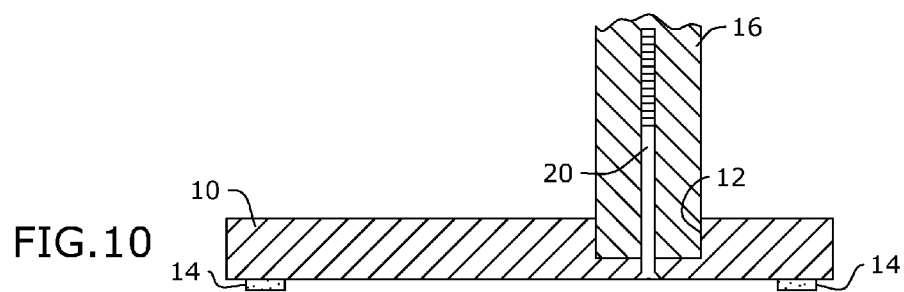
FIG. 10 is a section detail view of the present invention along line 10-10 in FIG. 9.

Referring to FIGS. 1 through 10, the present invention includes a swiveling vial holder formed of a base 10, a vertical post 16 and a bracket 22. The base 10 is configured to rest on a surface and support the swiveling vial holder in an upright position. The vertical post 16 may be substantially perpendicular to and extend vertically from the base 10. The bracket 22 includes an opening 26, 32 sized to secure a vial 48 within. The bracket 22 is secured to the vertical post 16 by a connector 40, 46. The bracket 22 may be secured to the vertical post 16 at different heights of the vertical post 16. Further, the bracket 22 is rotatable about an axis perpendicular to the vertical post 16.

In certain embodiments, the vertical post 16 may include a plurality of openings 18 aligned vertically along the height of the vertical post 16. In such embodiments, the connector 40, 46 may include a screw 46 and a nut 40. The bracket 22 may include an opening 36 that is alignable with each one of the vertically aligned openings 18. The screw 46 may run through the opening 36 of the bracket 22, through a first rubber washer 54, through an opening 18 of the vertical post 16, through a second rubber washer 54 and a metal washer 56. The bracket 22 may then rotate about the screw to a desired angle relative to the base 10. A wing nut 40 may be secured to the threaded end of the screw 46 and tightened so that the bracket 22 is fixed at the desired angle and height on the vertical post 16.

The bracket 22 may formed of a first block 24 and a second block 30. The first block 24 may include a first concave portion 26 and the second block 30 may include a second concave portion 32. When the first block 24 and the second block 30 are attached, the first concave portion 26 and the second concave portion 32 forms the opening 26, 32 in between. A rubber sleeve 42 may be secured within the opening 26, 32.

The first block 24 and the second block 30 may be secured together via screws 44. In such embodiments, the first block 24 may include openings 28 aligned with openings 34 formed in the second block 30. The screws 44 may run through the aligned openings 28, 34 and washers 38. Wing nuts 40 may be secured to the threaded end of the screws 40, securing the first block 24 and the second block 30 together. Loosening the wing nuts 40 may allow for the separation of the first block 24 and the second block 30, thereby expanding the opening 26, 32. Tightening the wing nuts 40 may urge the first block 24 and the second block 30 together, thereby reducing the size of the opening. Therefore, different sized vials 48 may be used with the present invention.

In certain embodiments, the base 10 may include a recessed portion 12 formed on a top surface. A bottom end of the vertical post 16 may fit within the recessed portion 12. An opening formed in the recessed portion 12 of the base 10 may align with an opening formed at the bottom of the vertical post 16. A screw 20 may be driven through the opening formed in the recessed portion 12 and into the opening formed at the bottom of the vertical post 16, thereby securing the vertical post 16 to the base 10. The base 10 may also include a plurality of rubber feet 14 secured to the bottom surface. The rubber feet 14 may prevent the base 10 from sliding on a surface.

A method of using the present invention may include the following. Users 52 that have to draw their own medication such as insulin from a vial 48 while using a syringe 50 can have problems withdrawing the correct dosage, or have bent needles or personal injuries. The swiveling vial holder is unique in that it permits a vial 48 of medication, such as insulin to be secured into the bracket 22. The bracket 22 is mounted at a convenient height and the swiveling feature permits the vial 48 to be placed at an angle that suits the user 52. The device is also adjustable to accept multiple vial sizes. The vial holder allows the user 52 to use both hands to hold the syringe 50 and withdraw the medication providing ease of use, accuracy of dosing and overall safety. The device can easily be refrigerated if the medication needs to be kept cold.

It should be understood, of course, that the foregoing relates to exemplary embodiments of the invention and that modifications may be made without departing from the spirit and scope of the invention as set forth in the following claims.

What is claimed is:

1. A swiveling vial holder comprising:
   a base configured to rest on a surface and support the swiveling vial holder in an upright position;
   a vertical post extending from the base;
   a bracket comprising a first block and a second block each comprising a concave portion forming a vial opening sized to secure a vial within, wherein the first block comprises a first screw opening and a second screw opening on either side of the concave portion and the second block comprises a third screw opening and a fourth screw opening on either side of the concave portion, wherein a first screw runs through aligned first screw opening and third screw opening and a second screw runs through aligned second screw opening and fourth screw opening, securing the first block and the second block together, wherein loosening and tightening the first screw and second screw adjusts a size of the vial opening; and
   a connector connecting the bracket to the vertical post, wherein the connector is operable to connect the bracket at a plurality of different heights along the vertical post,
   wherein the bracket rotates about an axis perpendicular to the vertical post.

2. The swiveling vial holder of claim 1, wherein the vertical post comprises a plurality of openings aligned vertically, wherein the connector comprises a screw sized to fit through aligning openings formed through the bracket and the vertical post.

3. The swiveling vial holder of claim 2, further comprising a nut threadably engagable with the screw so that the vertical post is disposed in between the nut and the bracket, wherein tightening the nut prevents the bracket from rotating about the axis and loosening the nut allows the bracket to rotate about the axis.

4. The swiveling vial holder of claim 1, further comprising a plurality of rubber feet secured to a bottom surface of the base.

5. The swiveling vial holder of claim 1, further comprising a gripping sleeve disposed within the opening of the bracket.

* * * * *